United States Patent Office 3,846,081
Patented Nov. 5, 1974

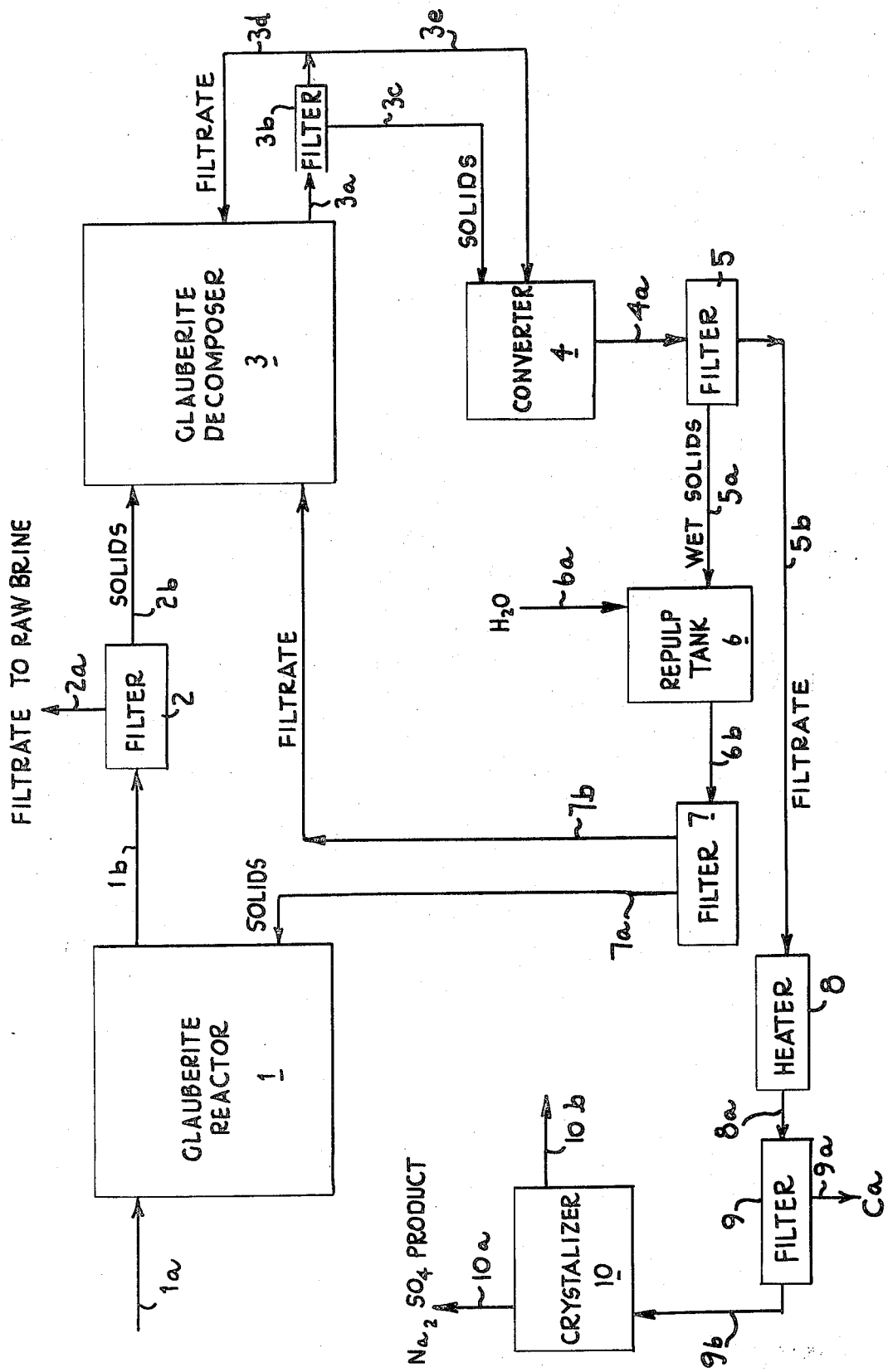

3,846,081
PROCESS FOR SEPARATING SODIUM SULFATE FROM BRINES
Warren E. Dean and John J. Posego, New Martinsville, W. Va., assignors to PPG Industries, Inc., Pittsburgh, Pa.
Filed Mar. 8, 1972, Ser. No. 232,770
Int. Cl. B01d 9/00; C01c 5/16; C01f 11/46
U.S. Cl. 23—297          11 Claims

ABSTRACT OF THE DISCLOSURE

Anhydrous sodium sulfate is more easily recovered from glauberite by decomposing the glauberite at a temperature sufficient to form sodium sulfate decahydrate and decomposing the resultant sodium sulfate decahydrate to form soluble sodium sulfate and gypsum. Because the sodium sulfate is appreciably more soluble in gypsum-containing brine than with brine containing glauberite, less water need to be evaporated to recover the anhydrous sodium sulfate.

---

This invention relates to a process for separating sodium sulfate from solutions containing same and particularly from brines employed in electrolytic mercury and diaphragm cells.

One method for recovering sodium sulfate from brines is disclosed in U.S. Pats. 1,343,443 and 3,399,961. There a double salt of sodium and calcium sulfate is formed which is known as glauberite ($Na_2SO_4 \cdot CaSO_4$) and then the glauberite decomposed by hydrolysis and the soluble sodium sulfate recovered from the solution by conventional evaporation techniques.

It has now been discovered that glauberite can be decomposed in water in a manner such that much higher sodium sulfate concentrations can be recovered to feed to an evaporator and thus reduce evaporation costs. More particularly, it has been discovered that if the glauberite in an aqueous slurry is hydrolyzed and adjusted to a temperature sufficiently low, the glauberite will decompose a substantial portion of the resultant soluble sodium sulfate will form solid sodium sulfate decahydrate. Then the temperature of the slurry can be raised to decompose the sodium sulfate decahydrate and form soluble sodium sulfate while the major part of the gypsum (calcium sulfate dihydrate) remains insoluble. The gypsum can then be recovered such as by filtration and the filtrate evaporated to recover the sodium sulfate product. This procedure effects an essentially complete removal of gypsum and provides a liquor stronger in sodium sulfate so that less water need be evaporated and consequently a more pure sodium sulfate is recovered at less expense.

Thus, it has been discovered that sodium sulfate is markedly less soluble in an aqueous slurry of glauberite and gypsum than in an aqueous slurry of sodium sulfate and gypsum, particularly if there is any appreciable amount of chloride ion in solution. When, however, the glauberite is substantially completely decomposed by adjusting the temperature to form sodium sulfate decahydrate, and the sodium sulfate decahydrate then decomposed, the resultant soluble sodium sulfate is now appreciably more soluble due to the absence of glauberite, and the gypsum is still insoluble.

Accordingly, although glauberite is formed at 85° C. and will slowly decompose at slightly lower temperatures, it is necessary according to the process of the invention to reduce the temperature sufficiently low that sodium sulfate decahydrate will form between about 15 and about 30° C. and preferably between about 22 and 26° C. where the slurry is not too viscous and substantially all of the glauberite is decomposed. Normally the decomposition takes place in 1 to 20 hours or less depending upon the agitation, size of the batch, particle size and temperature. Then the sodium sulfate decahydrate slurry is decomposed in a few minutes by raising the temperature to about 35° C. wherein the insoluble gypsum can be recovered and a substantially greater amount of sodium sulfate formed than heretofore.

For best results, the sodium sulfate decahydrate slurry is adjusted to a temperature between about 33° C. and about 40° C. because the solubility of the sodium sulfate decreases at higher temperatures and the sodium sulfate decahydrate does not decompose at lower temperatures. Then the water can be removed from the soluble sodium sulfate by evaporation at an elevated temperature to form the anhydrous sodium sulfate product.

These methods effect a greater solubility of up to approximately 100 percent more sodium sulfate with no increase in gypsum before evaporation.

The glauberite feed can be prepared in accordance with U.S. Pats. 1,343,443 and 3,399,961, at a temperature of about 85° C.

The process of the invention and its preferred embodiments are illustrated in detail in the drawing. Gypsum and sodium sulfate in sodium chloride brine are charged through conduit 1a to reactor 1 and the mixture heated to a temperature of about 85° C. where glauberite is formed. The mixture is then passed through conduit 1b to filter 2, the filtrate removed through conduit 2a and the solids passed through conduit 2b to glauberite decomposer 3, wherein the temperature is adjusted to between 22 and 26° C. so that sodium sulfate decahydrate can be formed. The mixture is then preferably passed through conduit 3a to filter 3b. The filtrate is taken to either or both the decomposer 3 or the converter 4 through conduits 3d and 3e in order to control the percent solids in the decomposer 3 and the sodium sulfate concentration in the converter 4. The solids are passed through conduit 3c to the converter 4 which is maintained at temperature of 35° C. in order to decompose the sodium sulfate decahydrate and passed directly through conduit 4a to filter 5 wherein the wet solids comprising gypsum and any remaining glauberite are removed and passed through conduit 5a to tank 6 wherein water is passed through conduit 6a to decompose any remaining glauberite and wash the sodium sulfate rich mother liquor from the solids and the mixture then passed through conduit 6b to filter 7. The solids phase consisting of principally gypsum is then passed through conduit 7a to reactor 1 and the filtrate comprising principally water and sodium sulfate passed through conduit 7b to glauberite decomposer 3. The filtrate from filter 5 can be passed through conduit 5b directly to crystallizer 10. An alternate procedure, however, is to pass the filtrate to heater 8 wherein the temperature is raised to about 100° C. in order to precipitate most of the gypsum and some sodium sulfate. The filtrate is then passed through conduit 8a to filter 9 wherein the solids are removed through conduit 9a and the filtrate passed through conduit 9b to crystallizer 10, and the substantially pure solid sodium sulfate product is recovered through conduit 10a. Excess sodium chloride is removed from crystallizer 10 through conduit 10b, and may be added back to reactor 1.

The following Examples will serve to illustrate the invention and its preferred embodiments.

EXAMPLE I

To 130 grams of wet glauberite cake was added 200 milliliters of a solution comprising 180 grams per liter sodium sulfate and the temperature maintained at 21–22° C. for about 2 hours and 50 minutes. A small increment of this slurry was filtered and an analysis of the filtrate showed it contained 137 grams per liter sodium sulfate and 1.7 grams per liter gypsum. The main slurry was then heated to 35° C. and filtered. The filtrate contained 416 grams per liter sodium sulfate and 2.12 grams per liter gypsum. The solids removed were principally gypsum.

EXAMPLE II

To a 2 liter decomposer was added 360 grams of wet glauberite cake and 700 cubic centimeters of 180 grams per liter aqueous sodium sulfate. The mixture was agitated for 2 hours at 25° C. and then filtered. The filtrate contained 280 grams per liter sodium sulfate and 30 grams per liter sodium chloride. This solution was stirred for 16 hours at 25° C. after which time the sodium sulfate concentration decreased to 234 grams per liter. A solid sodium sulfate decahydrate settled out when the stirring was terminated. The resulting slurry containing the solids was heated to 35° C. for 10 minutes. The mixture was then found to contain 300 grams per liter sodium sulfate, 2.06 grams per liter gypsum and 18 grams per liter sodium chloride. At this temperature, the sodium sulfate decahydrate was converted to sodium sulfate. The mixture was then heated to 100° C. and filtered, the resulting filtrate contained 299 grams per liter sodium sulfate and only 0.66 grams per liter gypsum and 18 grams per liter sodium chloride. The filtrate was then evaporated at approximately 100° C. and sodium sulfate was recovered containing less than 0.1 percent sodium chloride and 0.2 percent gypsum.

EXAMPLE III

To 130 grams of wet glauberite cake was added a 250 cubic centimeter slurry of 380 grams per liter sodium sulfate and 40 grams per liter sodium chloride. This mixture was cooled to 22° C. and 100 centimeters of water was added in order to have a slurry which could be easily stirred. The slurry was stirred at this temperature for 3 hours. The slurry was then heated to 35° C., maintained at that temperature for a few minutes, and filtered. The filtrate contained 385 grams per liter sodium sulfate, 39.4 grams per liter sodium chloride and 1.48 grams per liter gypsum. This concentrated sodium sulfate was then heated to evaporate water and recover anhydrous sodium sulfate.

We claim:

1. A process for recovering sodium sulfate from glauberite, which comprises hydrolyzing an aqueous slurry of glauberite at temperatures between 15° C. and 30° C. to form a slurry of insoluble sodium sulfate decahydrate and gypsum, raising the temperature of a slurry of the sodium sulfate decahydrate to between 33° C. and 100° C. to form a soluble sodium sulfate phase, and separating the soluble sodium sulfate phase from the insoluble gypsum.

2. The process of claim 1 wherein the separated soluble sodium sulfate phase is evaporated to form anhydrous sodium sulfate.

3. The process of claim 1 wherein the glauberite is hydrolyzed at temperatures of between 22° C. and 26° C. and the temperature to which the sodium sulfate decahydrate slurry is raised is between 33° C. and 40° C.

4. The process of claim 1 wherein the separated soluble sodium sulfate phase is heated to a temperature of at least 100° C., filtered and the resulting filtrate evaporated to thereby form anhydrous sodium sulfate.

5. The process of claim 1 wherein the source of the sodium sulfate is mercury electrolytic cell or diaphragm cell brine.

6. A process for removing and recovering sodium sulfate from brine containing same, which comprises treating said brine with gypsum for a time and at temperatures sufficient to form an insoluble glauberite phase, separating the insoluble glauberite phase from the brine, hydrolyzing an aqueous slurry of the glauberite at a temperature between 15° C. and 30° C. to form a slurry of insoluble sodium sulfate decahydrate and gypsum, raising the temperature of a slurry of the insoluble sodium sulfate decahydrate to a temperature between 33° C. and 100° C. to decompose the sodium sulfate decahydrate and form a soluble sodium sulfate phase, and evaporating the soluble sodium sulfate phase to thereby form anhydrous sodium sulfate.

7. The process of claim 6 wherein the brine is mercury electrolytic cell or diaphragm cell brine.

8. The process of claim 6 wherein the glauberite is hydrolyzed at temperatures of between 22° C. and 26° C. and the temperature to which the sodium sulfate decahydrate slurry is raised is between 33° C. and 40° C.

9. The process of claim 6 wherein insoluble gypsum is separated from the soluble sodium sulfate phase before evaporation.

10. The process of claim 6 wherein the decomposition of the sodium sulfate decahydrate forms a soluble sodium sulfate phase containing insoluble gypsum and glauberite, and wherein the insoluble gypsum and glauberite are, after separation from the soluble sodium sulfate phase, repulped with water to form a further soluble sodium sulfate phase and an insoluble phase of principally gypsum, and wherein the further soluble sodium sulfate phase is cycled to the glauberite hydrolysis step.

11. The process of claim 10 wherein the insoluble phase of principally gypsum is cycled to the brine treatment step.

References Cited

UNITED STATES PATENTS

| 2,333,138 | 4/1943 | Adams | 23—299 |
| 2,592,139 | 4/1952 | Hegan | 23—302 |
| 2,482,830 | 9/1949 | Allen | 23—302 |
| 2,989,371 | 6/1961 | Mehltretter | 23—296 |
| 2,242,507 | 5/1941 | Burg | 23—296 |
| 2,906,599 | 9/1950 | Roland | 423—184 |
| 1,922,283 | 8/1933 | Dering | 23—302 |

OTHER REFERENCES

Hightower, The Trona Process, Chemical Engineering, August 1951, pp. 104–106.

WILBUR L. BASCOMB, Jr. Primary Examiner

S. J. EMERY, Assistant Examiner

U.S. Cl. X.R.

23—302, 304; 423—158, 184, 208, 551